United States Patent
Patel et al.

(10) Patent No.: US 11,764,389 B2
(45) Date of Patent: Sep. 19, 2023

(54) FUEL CELL MANIFOLD HAVING AN EMBEDDED DIELECTRIC LAYER AND METHODS OF MAKING THEREOF

(71) Applicant: BLOOM ENERGY CORPORATION, San Jose, CA (US)

(72) Inventors: Siddharth Patel, Menlo Park, CA (US); Karanpal Bhangu, Manteca, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 0 days.

(21) Appl. No.: 18/052,690

(22) Filed: Nov. 4, 2022

(65) Prior Publication Data

US 2023/0146025 A1    May 11, 2023

Related U.S. Application Data

(60) Provisional application No. 63/298,431, filed on Jan. 11, 2022, provisional application No. 63/278,363, filed on Nov. 11, 2021.

(51) Int. Cl.
*H01M 8/2483* (2016.01)
*H01M 8/2485* (2016.01)

(52) U.S. Cl.
CPC ....... *H01M 8/2483* (2016.02); *H01M 8/2485* (2013.01)

(58) Field of Classification Search
CPC .................................................. H01M 8/248
See application file for complete search history.

(56) References Cited

U.S. PATENT DOCUMENTS

| | | | |
|---|---|---|---|
| 10,211,478 B2 | 2/2019 | Armstrong et al. | |
| 11,374,232 B2 | 6/2022 | Patel et al. | |
| 2007/0231666 A1* | 10/2007 | Wang | H01M 8/0206 429/514 |
| 2011/0223513 A1* | 9/2011 | Miller | H01M 8/2483 429/512 |
| 2017/0104233 A1 | 4/2017 | Armstrong et al. | |
| 2019/0372132 A1 | 12/2019 | Gasda et al. | |
| 2021/0351420 A1 | 11/2021 | Patel et al. | |

OTHER PUBLICATIONS

U.S. Appl. No. 17/804,913, filed Jun. 1, 2022, Bloom Energy Corp.

* cited by examiner

*Primary Examiner* — Haroon S. Sheikh
(74) *Attorney, Agent, or Firm* — THE MARBURY LAW GROUP PLLC

(57) ABSTRACT

A manifold plate for a fuel cell stack includes a lower manifold portion, an upper manifold portion, a dielectric layer sandwiched between the lower manifold portion and the upper manifold portion, a bottom inlet hole and a bottom outlet hole formed in a bottom surface of the lower manifold portion, where the bottom inlet hole and the bottom outlet hole extend through the dielectric layer, top outlet holes and top inlet holes formed in opposing sides of a top surface of the upper manifold portion, outlet channels fluidly connecting the top outlet holes to the bottom inlet hole, and inlet channels fluidly connecting the top inlet holes to the bottom outlet hole.

21 Claims, 15 Drawing Sheets

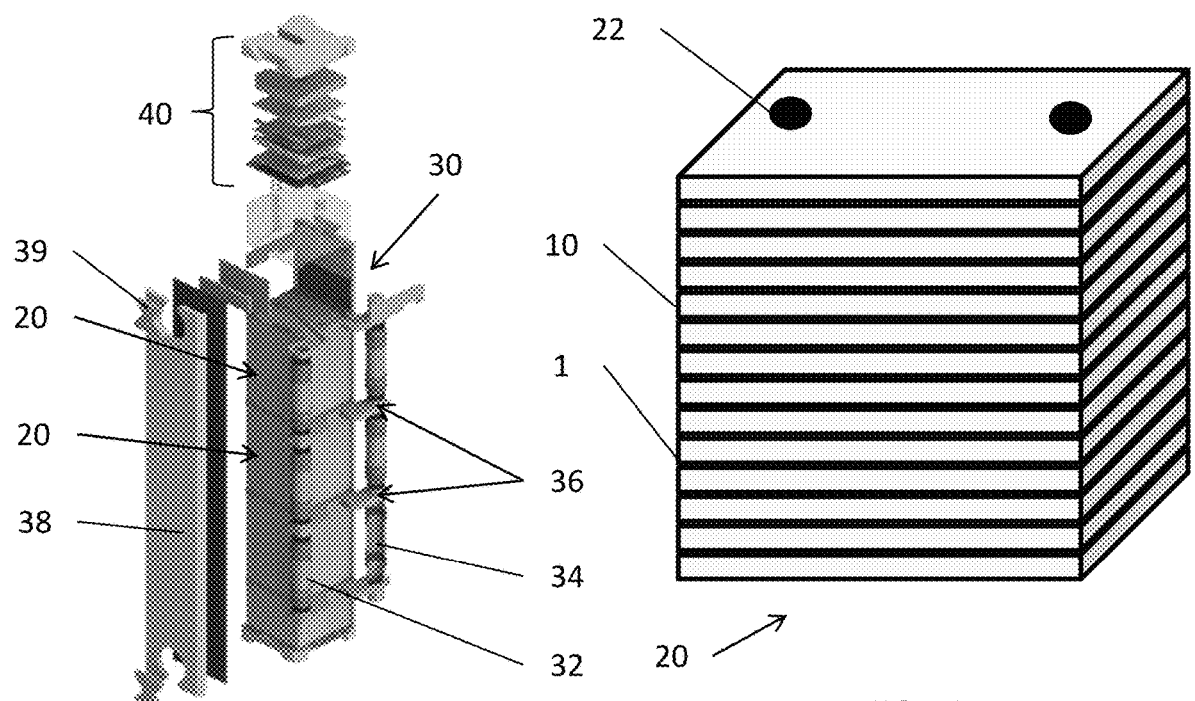
FIG. 1A
(Related Art)
FIG. 1B
(Related Art)
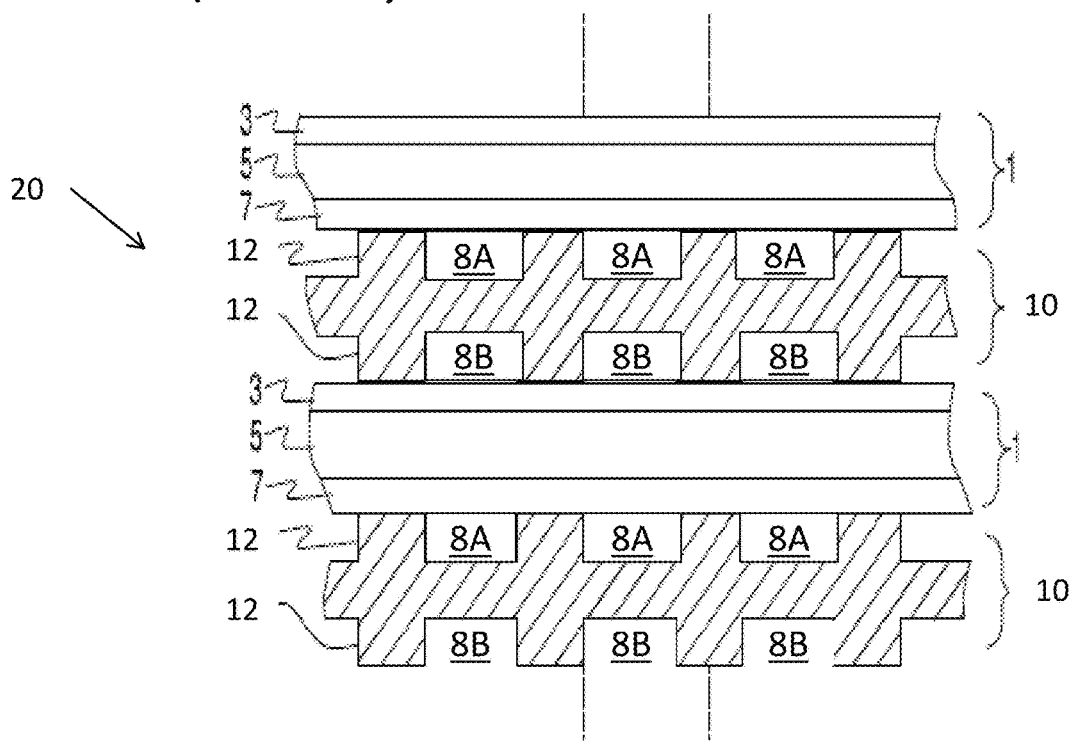
FIG. 1C
(Related Art)

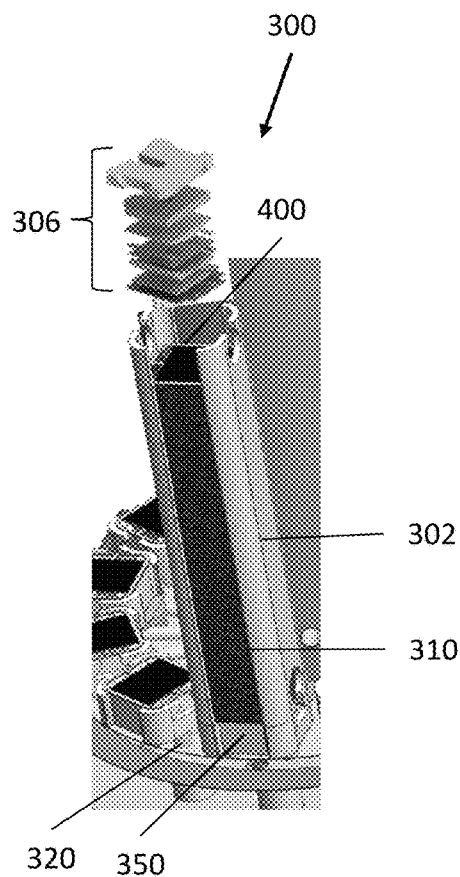
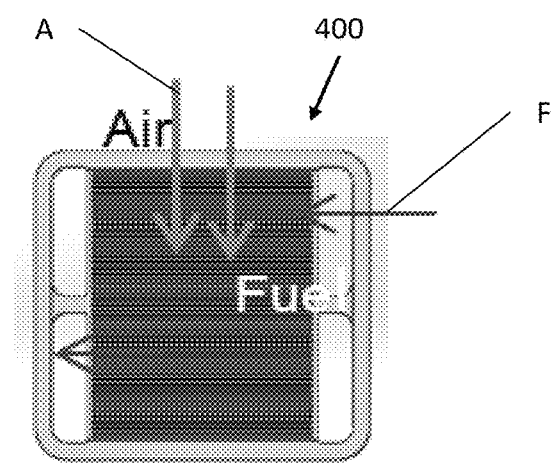
FIG. 3C
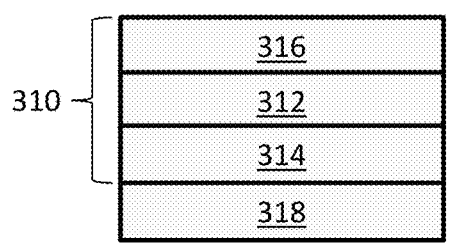
FIG. 3A
FIG. 3D
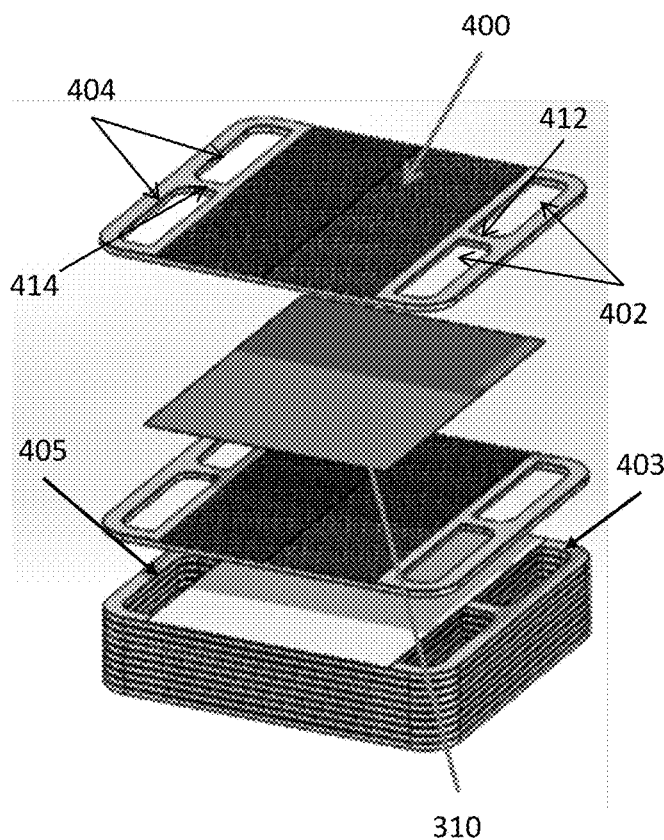
FIG. 3B

FUEL CELL MANIFOLD HAVING AN EMBEDDED DIELECTRIC LAYER AND METHODS OF MAKING THEREOF

FIELD

This disclosure is directed to fuel cell stacks in general, and to a fuel cell manifold in particular.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air are distributed to each cell using risers contained within the stack. In other words, the gas flows through openings or holes in the supporting layer of each fuel cell, such as the electrolyte layer, and gas flow separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air have to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to an embodiment, a manifold plate for a fuel cell stack includes a lower manifold portion, an upper manifold portion, and a dielectric layer sandwiched between the lower manifold portion and the upper manifold portion. The manifold plate may further include a bottom inlet hole and a bottom outlet hole formed in a bottom surface of the lower manifold portion, wherein the bottom inlet hole and the bottom outlet hole extend through the dielectric layer; and top outlet holes and top inlet holes formed in opposing sides of a top surface of the upper manifold portion. The manifold plate may further include outlet channels fluidly connecting the top outlet holes to the bottom inlet hole and inlet channels fluidly connecting the top inlet holes to the bottom outlet hole.

According to another embodiment, a method of manufacturing a manifold plate for a fuel cell stack comprises providing a lower manifold portion and an upper manifold portion, providing a dielectric layer, and assembling the lower manifold portion, the upper manifold portion, and the dielectric layer into the manifold plate such that the dielectric layer is sandwiched between the lower manifold portion and the upper manifold portion.

BRIEF DESCRIPTION OF THE DRAWINGS

The accompanying drawings, which are incorporated herein and constitute part of this specification, illustrate example embodiments of the disclosure, and together with the general description given above and the detailed description given below, serve to explain the features of the disclosure.

FIG. 1A is a perspective view of a conventional fuel cell column.

FIG. 1B is a perspective view of one counter-flow solid oxide fuel cell stack included in the column of FIG. 1A.

FIG. 1C is a side cross-sectional view of a portion of the stack of FIG. 1B.

FIG. 3A is a perspective view of a fuel cell stack, according to various embodiments.

FIG. 3B is an exploded perspective view of a portion of the stack of FIG. 3A, according to various embodiments.

FIG. 3C is a top view of the fuel side of an interconnect included in the stack of FIG. 3A, according to various embodiments.

FIG. 3D is a schematic view of a fuel cell included in the stack of FIG. 3A, according to various embodiments.

DETAILED DESCRIPTION

Figure 2A:
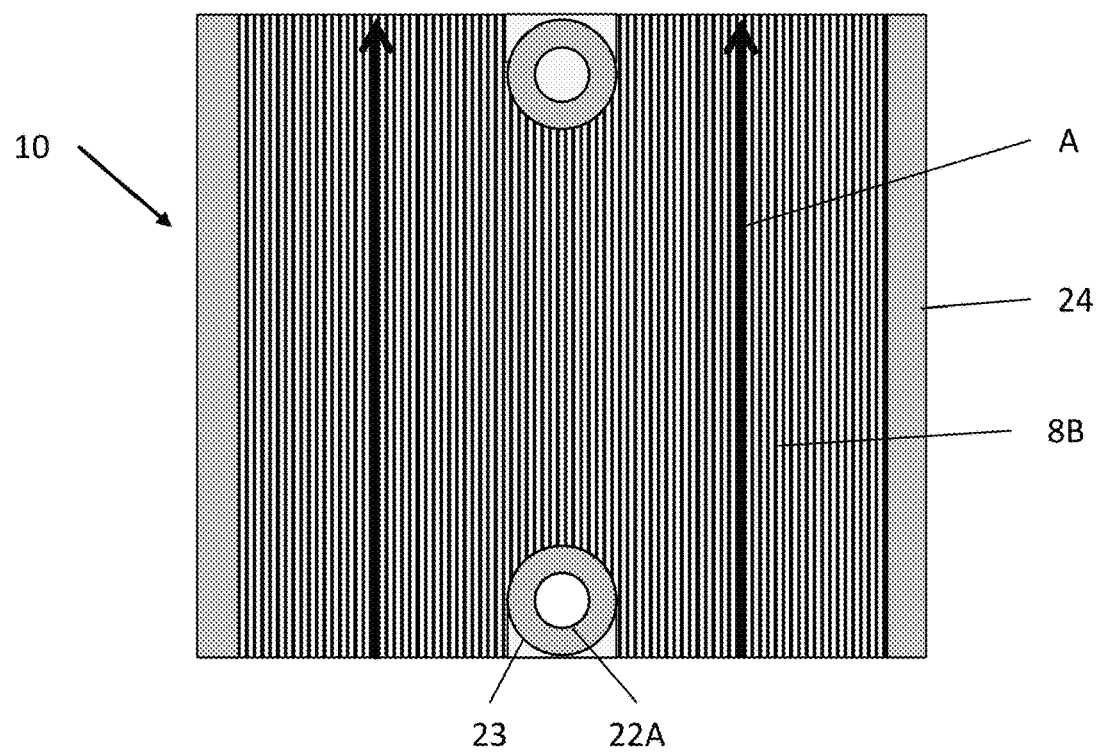
FIG. 2A is a top view of the air side of a conventional interconnect of the stack of FIG. 1B.

The various embodiments are described in detail with reference to the accompanying drawings. The drawings are not necessarily to scale, and are intended to illustrate various features of the disclosure. Wherever possible, the same reference numbers will be used throughout the drawings to refer to the same or like parts. References made to particular examples and implementations are for illustrative purposes, and are not intended to limit the scope of the disclosure or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

FIG. 1A is a perspective view of a conventional fuel cell column 30, FIG. 1B is a perspective view of one counter-flow SOFC stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASPs) 36). The column 30 may also include side baffles 38 and a compression assembly 40. The side baffles 38 may be connected to the compression assembly 40 and an underlying stack component (not shown) by ceramic connectors 39. The fuel inlet conduit 32 is fluidly connected to the ASPs 36 and is configured to provide the fuel feed to each ASP 36, and anode exhaust conduit 34 is fluidly connected to the ASPs 36 and is configured to receive anode fuel exhaust from each ASP 36.

The ASPs 36 are disposed between the stacks 20 and are configured to provide a hydrocarbon fuel containing fuel feed to the stacks 20 and to receive anode fuel exhaust from the stacks 20. For example, the ASPs 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2B:
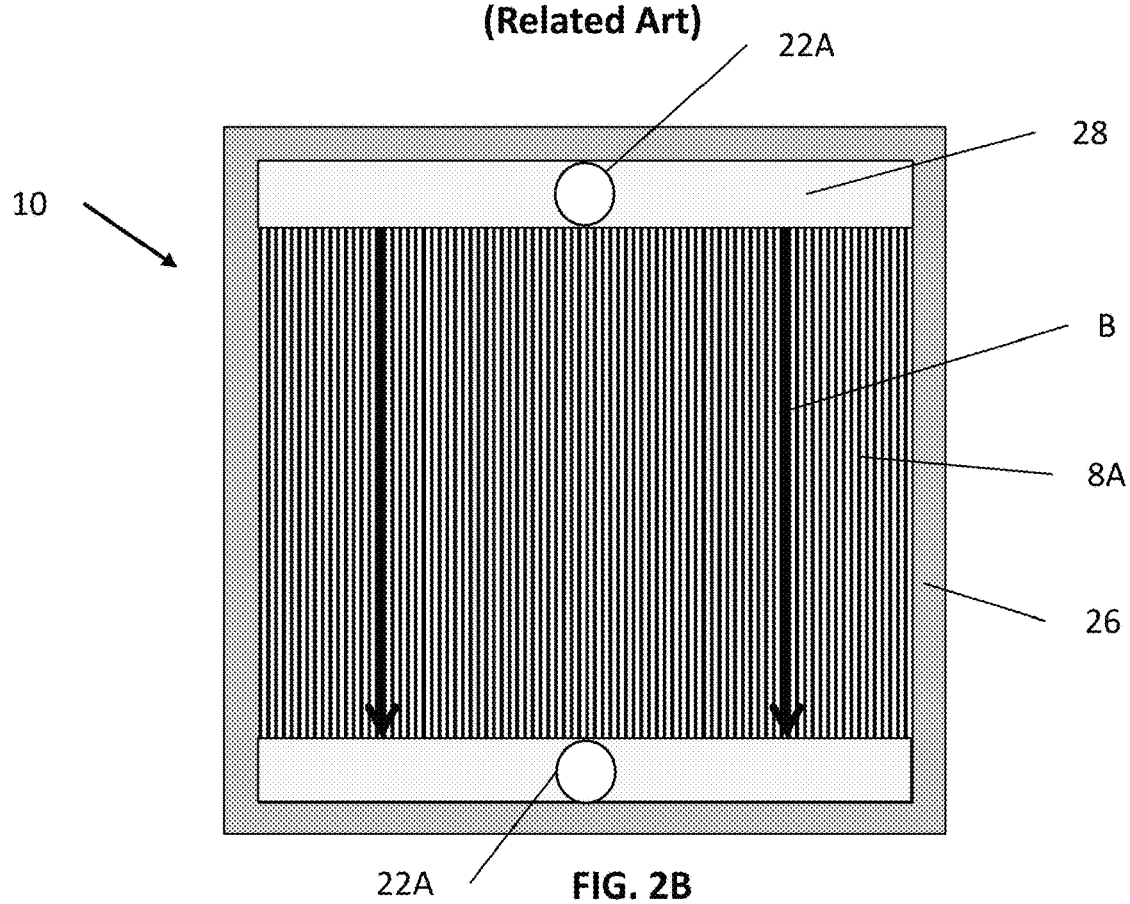
FIG. 2B is a top view of the fuel side of a conventional interconnect of the stack of FIG. 1B.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 and fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

FIG. 3A is a perspective view of a fuel cell stack 300, according to various embodiments, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASPs, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. The interconnects 400 may typically be fabricated using a powder metallurgy technique that includes pressing and sintering a Cr—Fe powder, which may be a mixture of Cr and Fe powders or a Cr—Fe alloy powder, to form a Cr—Fe interconnect in a desired size and shape (e.g., a "net shape" or "near net shape" process). A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400. The fuel cell 310 does not include through-holes, such as the fuel holes of conventional fuel cells. Therefore, the fuel cell 310 avoids cracks that may be generated due to the presence of such through-holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include ASPs and the end plates associated therewith, the stack 300 may include only two end plates. As a result, stack dimensional variations associated with the use of intra-column ASPs may be avoided.

The stack 300 may include side baffles 302, a fuel plenum 350, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 350 and the compression assembly 306, such that the compression assembly 306 may apply pressure to the stack 300. The side baffles 302 may be curved baffle plates, such that each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 350 may be disposed below the stack 300 and may be configured to provide a hydrogen-containing fuel feed to the stack 300, and may receive an anode fuel exhaust from the stack 300. The fuel plenum 350 may be connected to fuel inlet and outlet conduits 320 which are located below the fuel plenum 350.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include fuel holes that extend through the interconnect 400 and that are configured for fuel distribution. For example, the fuel holes may include one or more fuel inlets 402 and one or more fuel (e.g., anode exhaust) outlets 404, which may also be referred to as anode exhaust outlets 404. The fuel inlets and outlets 402, 404 may be disposed outside of the perimeter of the fuel cells 310. As such, the fuel cells 310 may be formed without corresponding through-holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 350 to the fuel cells 310. The fuel outlet riser 405 may be configured to provide anode exhaust received from the fuel cells 310 to the fuel plenum 350.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel riser 403. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

A surface of an interconnect 400 that in operation is exposed to an oxidizing environment (e.g., air), such as the cathode-facing side of the interconnect 400, may be coated with a protective coating layer in order to decrease the growth rate of a chromium oxide surface layer on the interconnect and to suppress evaporation of chromium vapor species which can poison the fuel cell cathode. Typically, the coating layer, which can comprise a perovskite such as LSM, may be formed using a spray coating or dip coating process. Alternatively, other metal oxide coatings, such as a spinel, such as an $(Mn, Co)_3O_4$ spinel (MCO), can be used instead of or in addition to LSM. Any spinel having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used. In other embodiments, a mixed layer of LSM and MCO, or a stack of LSM and MCO layers may be used as the coating layer.

Figure 4A:
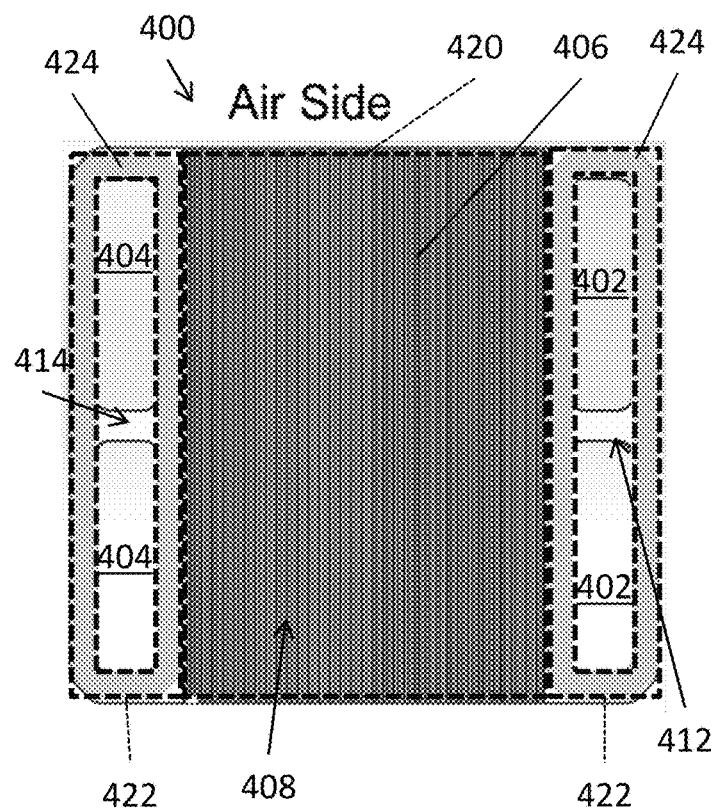
FIG. 4A is a plan view showing an air side of the cross-flow interconnect of FIG. 3C, according to various embodiments.
Figure 4B:
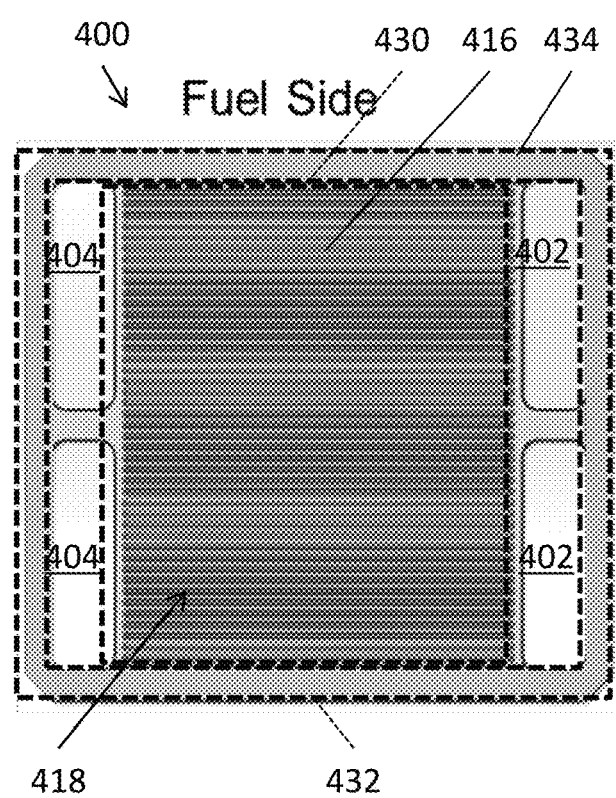
FIG. 4B is a plan view showing a fuel side of the cross-flow interconnect of FIG. 3C, according to various embodiments.

FIGS. 4A and 4B are plan views showing, respectively, an air side and a fuel side of the cross-flow interconnect 400, according to various embodiments. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and a perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

As shown in FIG. 1A, in a conventional fuel cell system, fuel and fuel exhaust are provided to and received from a fuel cell stack through metal anode splitter plates 36. The anode splitter plates 36 are fluidly connected to one another by the fuel inlet conduit 32 and the anode exhaust conduit 34. The conduits 32, 34 include metal tubes that are welded to the anode splitter plates 36 and to ceramic components that serve as dielectric breaks. As such, fluidly connecting the anode splitter plates 36 relies upon expensive dielectric components and a significant amount of on-site welding. Therefore, there is a need for a more cost effective method for providing fuel to, and receiving fuel exhaust from, a fuel cell stack.

Figure 5A:
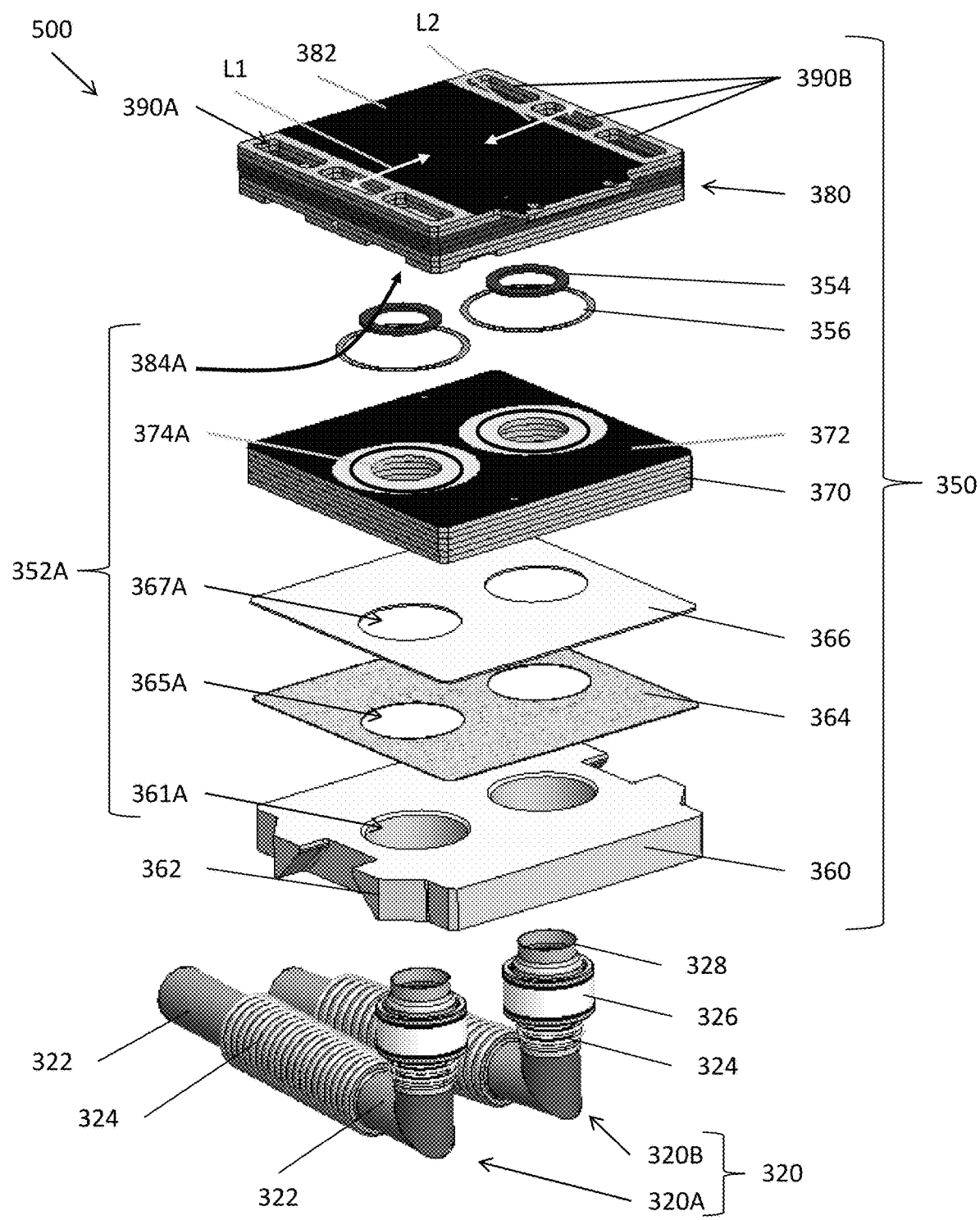
FIG. 5A is an exploded top perspective view of a fuel flow structure, according to various embodiments.
Figure 5B:
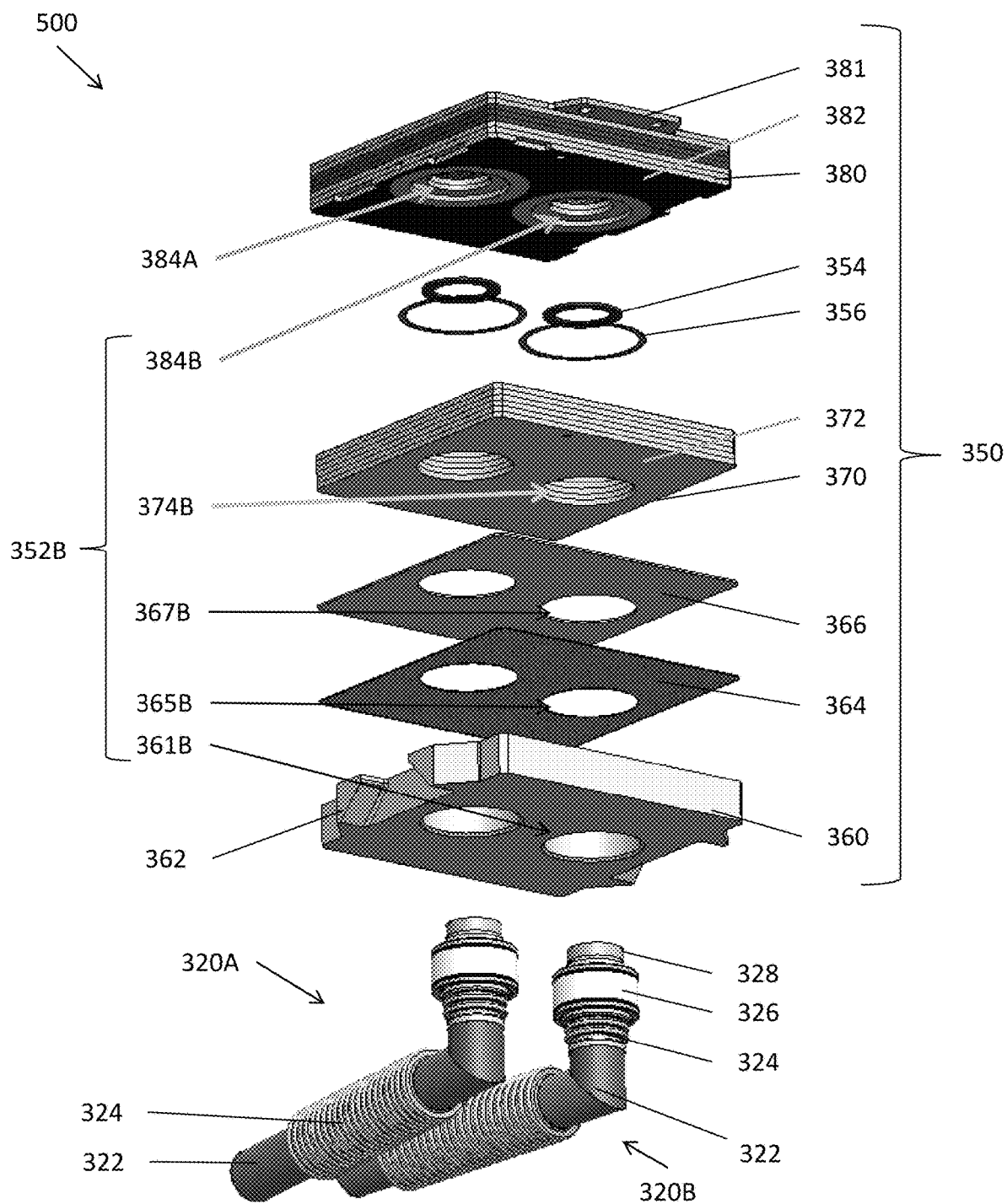
FIG. 5B is an exploded bottom perspective view of the fuel flow structure of FIG. 5A, according to various embodiments.

FIG. 5A is an exploded top perspective view of an fuel flow structure 500, according to various embodiments of the present disclosure, and FIG. 5B is an exploded bottom perspective view of the fuel flow structure 500 of FIG. 5A. Referring to FIGS. 5A and 5B, the fuel flow structure 500 includes fuel conduits 320 and a fuel plenum 350. The fuel plenum 350 may include a seal ring 354, glass or glass ceramic seals 356, a base plate 360, a dielectric layer 364, a cover plate 366, a seal plate 370, and a manifold plate 380.

The fuel plenum 350 may be configured to form a fluid-tight connection with the fuel conduits 320. The fuel conduits 320 may include an inlet conduit 320A configured to provide fuel to the fuel plenum 350, and an outlet conduit 320B configured to receive fuel exhaust from the fuel plenum 350. The fuel conduits 320 may include metal tubes 322, metal bellows 324, and dielectric rings 326. The metal tubes 322 may be coupled to the bellows 324 and the dielectric rings 326 by brazing, welding, or press-fitting, for example. The bellows 324 may act to compensate for differences in coefficients of thermal expansion between fuel cell components by deforming to absorb stress. In alternate embodiments, the metal tubes 322 may themselves include, or be made entirely of bellows, rather than be coupled with the bellows 324 such that the metal tubes/bellows 322 may be directly coupled with the dielectric ring 326. The dielectric rings 326 may operate as dielectric breaks, to prevent current from being conducted through the fuel conduits 320 and electrically shorting a fuel cell stack disposed on the fuel plenum 350.

The base plate 360, dielectric layer 364, and cover plate 366 may respectively include inlet holes 361A, 365A, 367A and outlet holes 361B, 365B, 367B, which may be through-holes that extend through the respective plates and layer. The base plate 360 may include protrusions 362 configured to mate with ceramic connectors 39, as shown in FIG. 1A. The base plate 360 and the cover plate 366 may be formed of a densified dielectric material. For example, the base plate 360 and the cover plate 366 may be formed of a substantially non-porous, electrically-insulating ceramic material, such as alumina, zirconia, yttria stabilized zirconia (YSZ) (e.g., 3% yttria stabilized zirconia), or the like. The base plate 360 and the cover plate 366 may be rigid plates configured to provide support to the dielectric layer 364.

In some embodiments, the dielectric layer 364 may be formed of a ceramic material having a higher dielectric constant than the ceramic materials of the base plate 360 and/or the cover plate 366. In other words, the dielectric layer 364 may be able to withstand a higher maximum electric field without electrical breakdown and becoming electrically conductive (i.e., have a higher breakdown voltage) than the base plate 360 and the cover plate 366. For example, the dielectric layer 364 may be formed of one or more layers of a porous ceramic yarn or fabric that is highly electrically insulating at high temperatures, such as Nextel ceramic fabrics numbers 312, 440 or 610, available from 3M Co.

In other embodiments, the dielectric layer 364 may be formed of a ceramic matrix composite (CMC) material, or any comparable material that has high dielectric strength, due to having a high surface area to volume ratio. The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. In one embodiment, both matrix and fibers may comprise alumina. Accordingly, the dielectric layer 364 may be configured to operate as a dielectric break to prevent electrical conduction through the fuel plenum 350.

The cover plate 366 and the base plate 360 may have a higher density than the dielectric layer 364. For example, the cover plate 366 and/or the base plate 360 may be formed of a fully dense ceramic material, such as 97% to 99.5% dense alumina, or the like. The cover plate 366 is configured to separate the seal plate 370 from the dielectric layer 364. As such, the cover plate 366 may be configured to prevent the diffusion of metallic species from the seal plate 370 into the dielectric layer 364. For example, the cover plate 366 may reduce and/or prevent the diffusion of chromium species (e.g., chromium oxides) from the seal plate 370 into the dielectric layer 364, in order to prevent the chromium species from reducing the dielectric strength of the dielectric layer 364 and/or otherwise degrading the structural integrity of the dielectric layer 364.

The seal plate 370 and the manifold plate 380 may be formed of a metal or metal alloy, such as stainless steel, that may be easily welded to the fuel conduits 320. For example, the seal plate 370 and/or the manifold plate 380 may be formed of 446 stainless steel or the like. 446 stainless steel includes 23 to 27 weight % Cr, 1.5 weight % or less Mn, 1 weight % or less of one or more of Si, Ni, C, P and/or S, and balance Fe. In some embodiments, the seal plate 370 and/or the manifold plate 380 may be formed by brazing multiple metal sub-plates together. In embodiments formed using metal sub-plates, each of the sub-plates may be cut to form various structures, such as holes and/or channels, prior to, or after, the brazing process. In some embodiments, laser cutting or the like may be used to cut such structures.

The seal plate 370 and the manifold plate 380 may respectively include coatings 372, 382 on one or both sides, such as at least on the sides of the plates 370, 380 that face each other. The coatings 372, 382 may have a thickness ranging from about 75 µm to about 200 µm, such as from about 100 µm to about 175 µm, from about 110 µm to about 140 µm, or about 120 µm. Typically, the coatings 372, 382 may comprise a metal oxide material, such as a perovskite material, for example, lanthanum strontium manganite (LSM). Alternatively, other metal oxide coatings, such as a spinel, such as an (Mn, Co)3O4 spinel (MCO), can be used instead of or in addition to LSM. Any spinel having the composition $Mn_{2-x}Co_{1+x}O_4$ (0≤x≤1) or written as $z(Mn_3O_4)+(1-z)(Co_3O_4)$, where (⅓≤z≤⅔) or written as $(Mn, Co)_3O_4$ may be used. In other embodiments, a mixed layer of LSM and MCO, or a stack of LSM and MCO layers may be used as the coatings 372, 382. The coatings 372, 382 may be formed using a spray coating or dip coating process and may be applied to substantially all the outer surfaces of the seal plate 370 and the manifold plate 380.

The seal plate 370 may include an inlet hole 374A and an outlet hole 374B, which may be through-holes that extend between top and bottom surfaces thereof. The manifold plate 380 may include a bottom inlet hole 384A and a bottom outlet hole 384B formed in the bottom surface thereof, and top inlet holes 390A and top outlet holes 390B, which may be formed in the top surface thereof, on opposing sides of the manifold plate 380. While three top inlet holes 390A and three top outlet holes 390B are shown, the present disclosure is not limited to any particular number of top outlet and inlet holes 390A, 390B. For example, the manifold plate 380 may include two, four, five or more top inlet holes 390A, and may include two, four, five or more top outlet holes 390B, depending on a number of fuel inlets and outlets included in the interconnects 400 of a corresponding fuel cell stack. For example, if the interconnects have three inlets and three outlets, then the manifold plate 380 has three inlet holes 390A and three outlet holes 390B.

The base plate 360, dielectric layer 364, cover plate 366, seal plate 370, and manifold plate 380 may be stacked on one another, such that the inlet holes 361A, 365A, 367A, 374A, 384A are aligned to form an inlet conduit passage 352A, and the outlet holes 361B, 365B, 367B, 374B, 384B are aligned to form an outlet conduit passage 352B. The inlet and outlet conduits 320A, 320B may be inserted into the respective inlet and outlet conduit passages 352A, 352B such that ends 328 of the inlet and outlet conduits 320A, 320B may extend up to and/or past the upper surface of the seal plate 370.

Figure 6A:
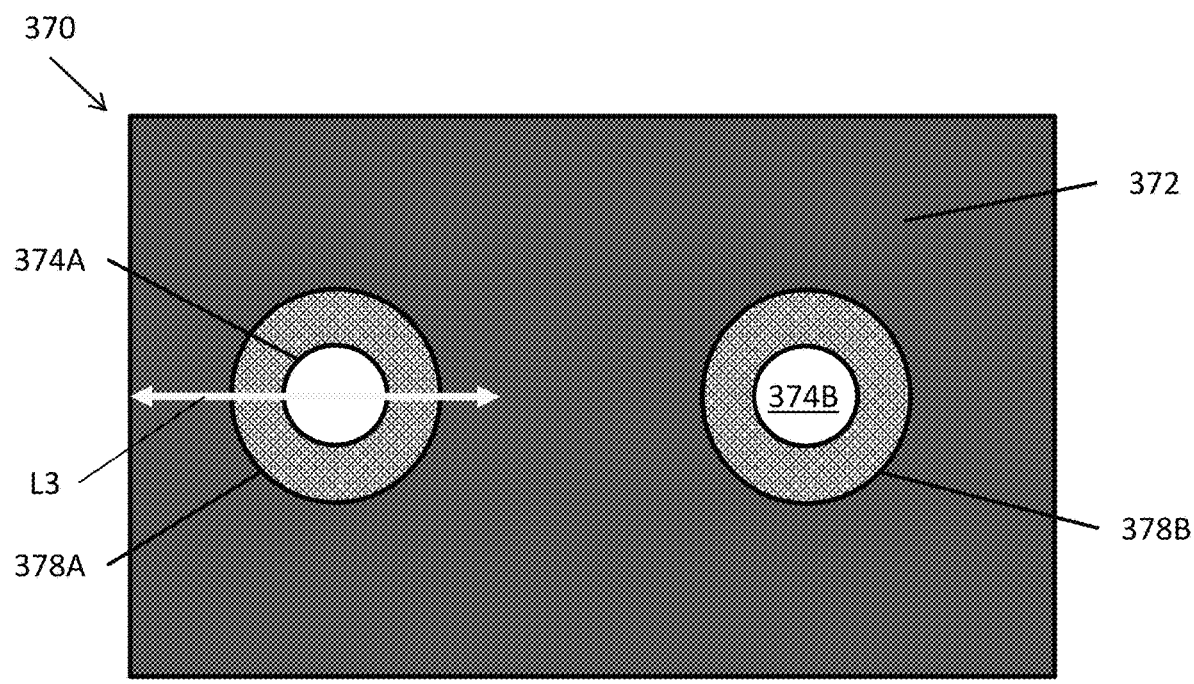
FIG. 6A is a top view of a seal plate of the fuel flow structure of FIGS. 5A and 5B, according to various embodiments.
Figure 6B:
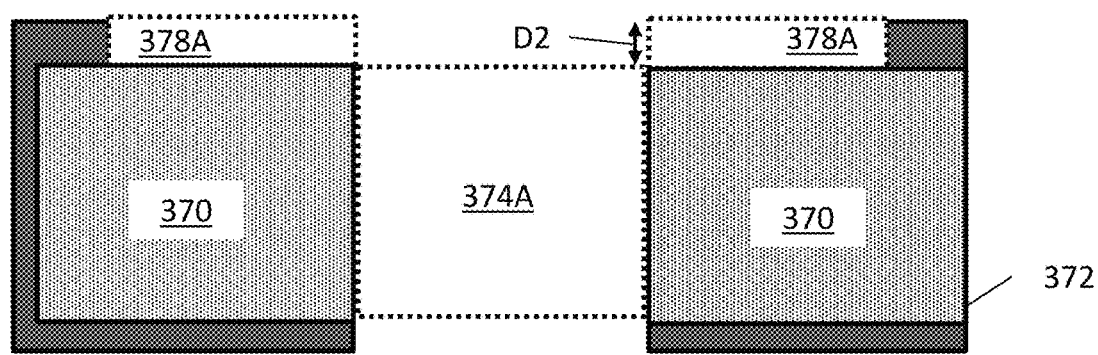
FIG. 6B is a cross-sectional view of the seal plate of FIG. 6A taken along the line L3 of FIG. 6A, according to various embodiments.

FIG. 6A is a top view of the seal plate 370, and FIG. 6B is a cross-sectional view taken along the line L3 of FIG. 6A. An inlet seal region 378A and an outlet seal region 378B may be respectively formed around the inlet and outlet holes 374A, 374B in areas where the coating 372 is not applied to the top surface of the seal plate 370. As such, the inlet and outlet seal regions 378A, 378B may have a depth D2 equal to the thickness of the coating 372, such as a depth D2 of about 120 µm.

Figure 7A:
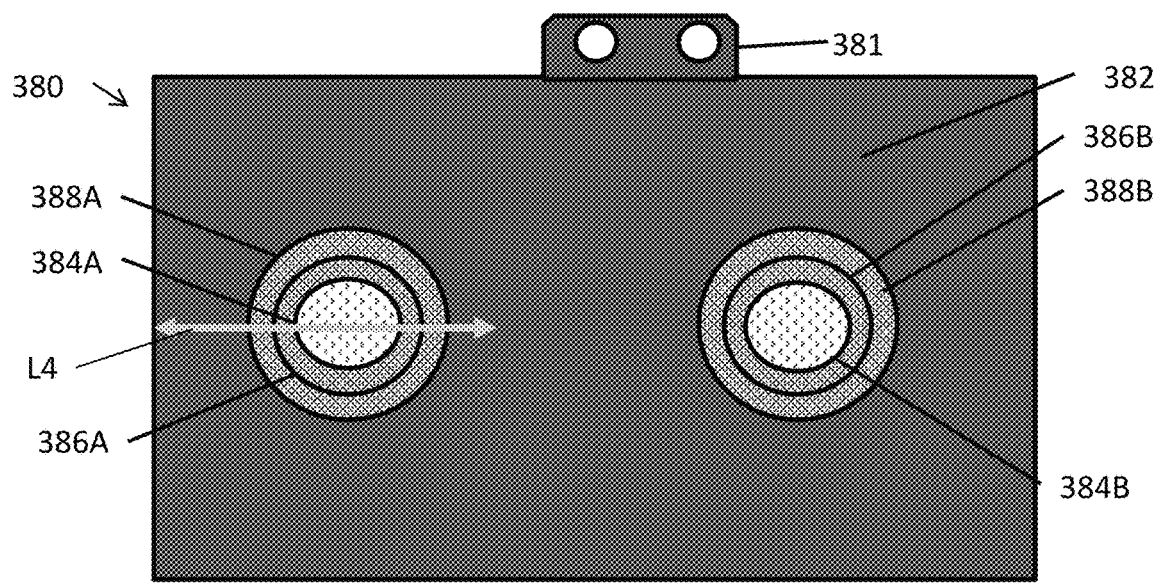
FIG. 7A is a bottom view of a manifold plate of the fuel flow structure of FIGS. 5A and 5B, according to various embodiments.
Figure 7B:
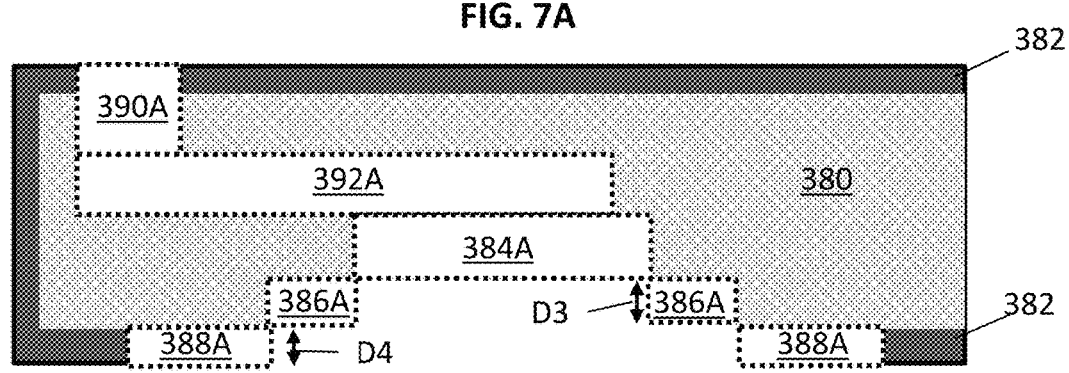
FIG. 7B is a cross-sectional view of the manifold plate of FIG. 7A taken along the line L4 of FIG. 7A, according to various embodiments.
Figure 7C:
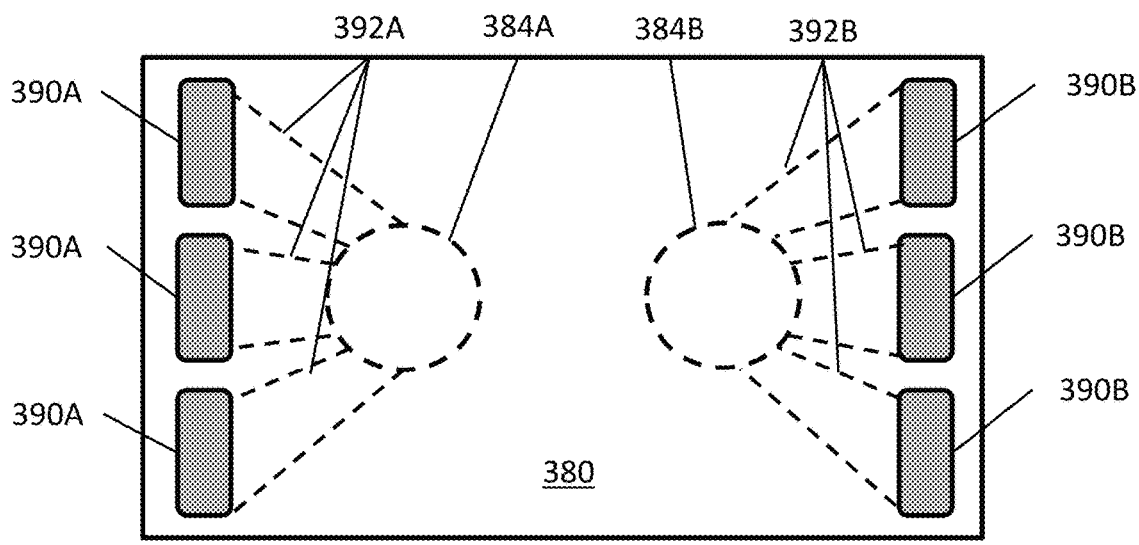
FIG. 7C is a schematic top view of the manifold plate of FIG. 7A, according to various embodiments.

FIG. 7A is a bottom view of the manifold plate 380, FIG. 7B is a cross-sectional view taken along the line L4 of FIG. 7A, and FIG. 7C is a schematic top view of the manifold plate 380, according to various embodiments of the present disclosure. Referring to FIGS. 7A-7C, inlet and outlet recesses 386A, 386B may be formed in the bottom surface of the manifold plate 380, respectively surrounding the bottom inlet and outlet holes 384A, 384B. The inlet and outlet recesses 386A, 386B may have a depth D3 ranging from about 0.5 mm to about 6 mm, such as from about 1 cm to about 3 cm, such as from about 0.5 cm to about 2 cm, or about 1 cm.

Inlet and outlet seal regions 388A, 388B may be respectively formed around the inlet and outlet recesses 386A, 386B, in areas where the coating 382 is not applied to the bottom surface of the manifold plate 380. As such, the inlet and outlet seal regions 388A, 388B may have a depth D4 equal to the thickness of the coating 382, such as a depth D4 of about 120 µm.

The manifold plate 380 may also include internal inlet channels 392A and outlet channels 392B. The inlet channels 392A may fluidly connect the bottom inlet hole 384A to respective top inlet holes 390A. The outlet channels 392B may fluidly connect the bottom outlet hole 384B to respective top outlet holes 390B. The inlet channels 392A may be configured such that substantially equal amounts of fuel (e.g., equal fuel flow rates) are provided to each top inlet hole 390A from the common bottom inlet hole 384A. The outlet channels 392B may be configured such that substantially equal amounts of fuel exhaust are provided from each top outlet hole 390B to the common bottom outlet hole 384B.

In addition, the manifold plate 380 may include an electrical contact 381. The manifold plate 380 may be electrically connected to the bottom of a fuel cell stack, and the electrical contact 381 may extend laterally from the manifold plate 380 and may be configured to provide a connection point for connecting the manifold plate 380 to a current collection circuit.

Figure 8A:
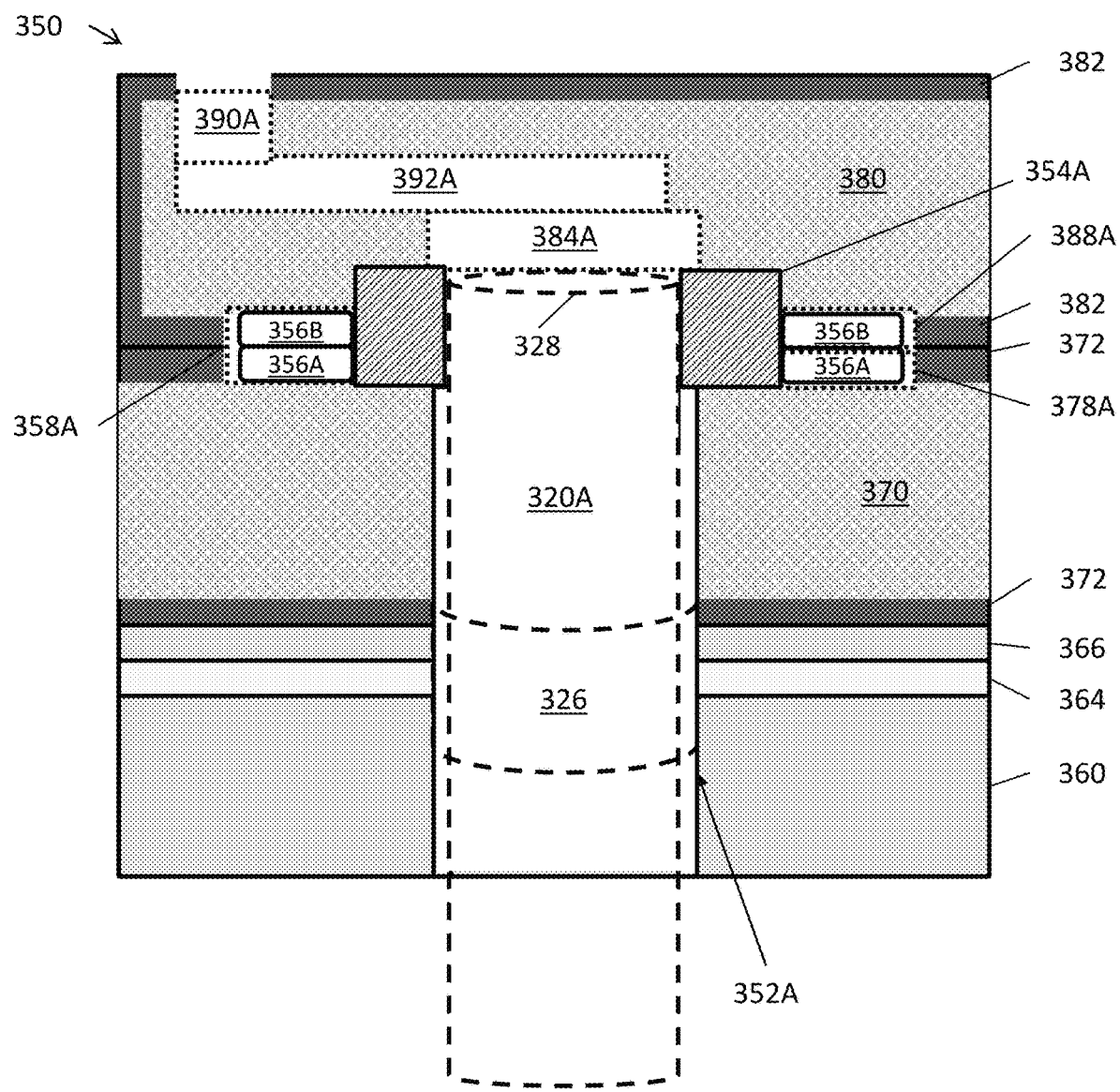
FIG. 8A is a vertical cross-sectional view of the fuel flow structure of FIGS. 5A and 5B taken along the line L1 of FIG. 5A, showing an assembled fuel plenum and inlet conduit, according to various embodiments.
Figure 8B:
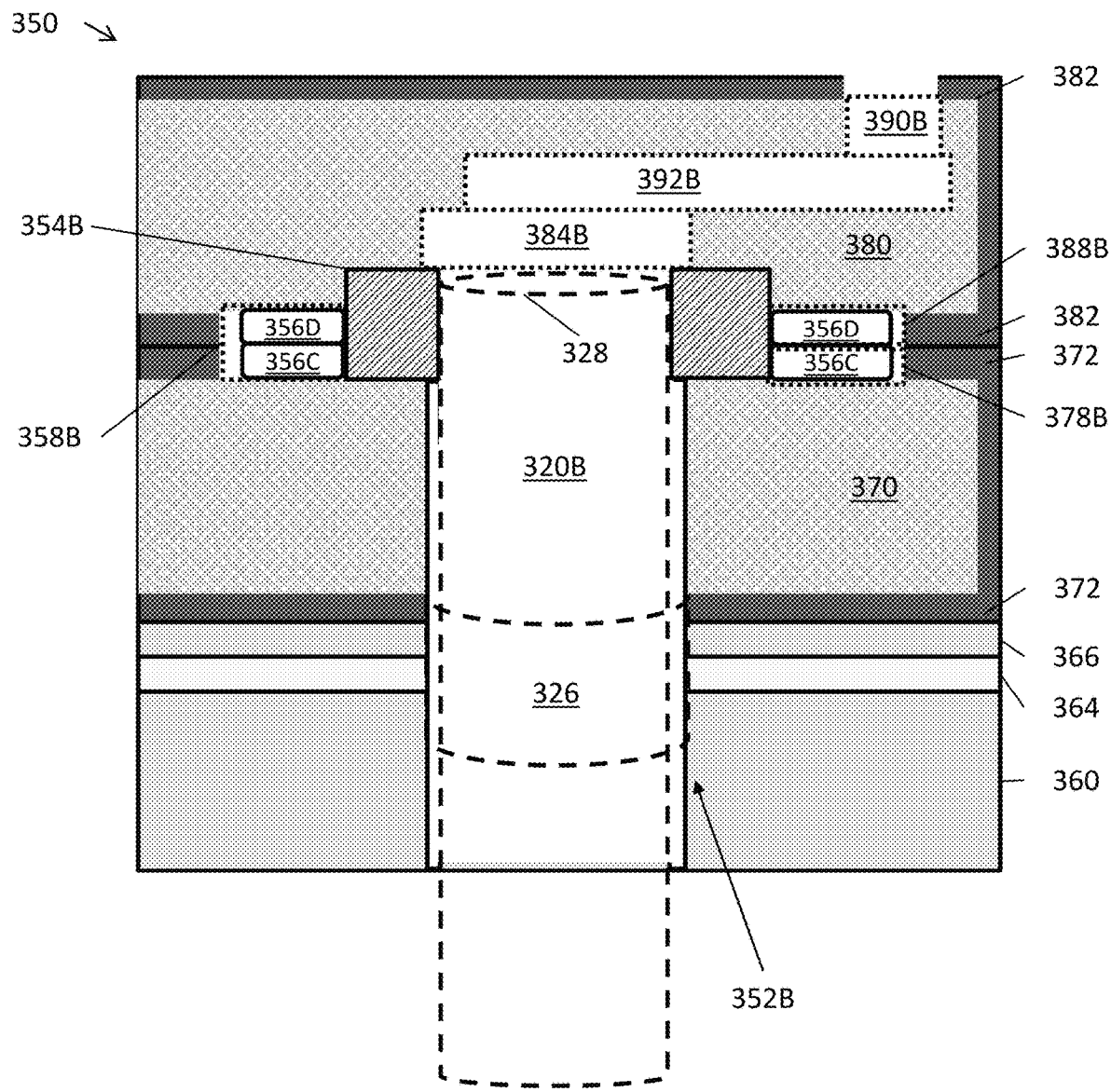
FIG. 8B is a vertical cross-sectional view of the fuel flow structure of FIGS. 5A and 5B taken along the line L2 of FIG. 5A, showing the assembled fuel plenum and outlet conduit, according to various embodiments.

FIG. 8A is a vertical cross-sectional view taken along the line L1 of FIG. 5A, showing the assembled fuel plenum 350 and inlet conduit 320A, and FIG. 8B is a vertical cross-sectional view or along the line L2 of FIG. 5A, showing the assembled fuel plenum 350 and outlet conduit 320B.

Referring to FIGS. 5A, 5B, 8A, and 8B, the base plate 360, dielectric layer 364, cover plate 366, seal plate 370, and manifold plate 380 are stacked on one another, thereby forming the inlet conduit passage 352A and the outlet conduit passage 352B. The inlet conduit 320A may be inserted in the inlet conduit passage 352A, facing the bottom inlet hole 384A. The outlet conduit 320B may be inserted in the outlet conduit passage 352B, facing the bottom outlet hole 384B.

A first seal ring 354A may be disposed in the inlet recess 386A on the bottom surface of the manifold plate 380 and around the inlet conduit 320A. A second seal ring 354B may be disposed in the outlet recess 386B on the bottom surface of the manifold plate 380 and around the outlet conduit 320B. The inlet and outlet conduits 320A, 320B may be welded to the seal plate 370. In particular, the welding process may include welding the first and second seal rings 354A, 354B to the inlet and outlet conduits 320A, 320B, and welding the first and second seal rings 354A, 354B to the surface of the seal plate 370 to ensure that a fluid-tight seal is formed between the inlet and outlet conduits 320A, 320B and the seal plate 370.

A first glass or glass ceramic seal 356A may be disposed in the inlet seal region 378A of the seal plate 370, and a second glass or glass ceramic seal 356B may be disposed in the inlet seal region 388A of the manifold plate 380. A third glass or glass ceramic seal 356C may be disposed in the outlet seal region 378B of the seal plate 370, and a fourth glass or glass ceramic seal 356D may be disposed in the outlet seal region 388B of the manifold plate 380. However, in other embodiments, a single glass or glass ceramic seal may be used. The seals 356A-356D may be heated to soften the seals 356A-356D, such that the seals 356A-356D form fluid-tight connections that physically connect the seal plate 370 to the manifold plate 380.

The inlet seal regions 378A, 388A may overlap to form an inlet seal area 358A, and the outlet seal regions 378B, 388B may overlap to form an outlet seal area 358B. The first and second seals 356A, 356B may be stacked on one another in the inlet seal area 358A, and the third and fourth seals 356C, 356D may be stacked on one another in the outlet seal area 358B. The coatings 372, 382 may be stacked on one another. As such, the height of the inlet and outlet seal areas 358A, 358B may be equal to the combined thickness of the coatings 372, 382.

The inlet and outlet seal areas 358A, 358B may provide space for the glass or glass ceramic seals 356A-356D to expand laterally when heated to fuel cell system operating temperatures, thereby reducing stress applied to the glass or glass ceramic seals 356A-356D over time. In addition, since the seal plate 370 and the manifold plate 380 may be formed of the same materials, the seal plate 370 and the manifold plate 380 may have matched coefficients of thermal expansion (CTEs). Therefore, stress applied to the glass or glass ceramic seals 356A-356D over time may be further reduced.

The glass or glass ceramic seals 356A-356D may be formed of a high-temperature glass or glass ceramic material, such as a silicate or aluminosilicate glass or glass ceramic material. In some embodiments, the glass or glass ceramic seals 356A-356D may be formed of a silicate glass or glass ceramic seal material comprising $SiO_2$, BaO, CaO, $Al_2O_3$, $K_2O$, and/or $B_2O_3$. For example, the seal material may include, by weight: $SiO_2$ in an amount ranging from about 40% to about 60%, such as from about 45% to about 55%; BaO in an amount ranging from about 10% to about 35%, such as from about 15% to about 30%; CaO in an amount ranging from about 5% to about 20%, such as from about 7% to about 16%; $Al_2O_3$ in an amount ranging from about 10% to about 20%, such as from about 13% to about 15%; and $B_2O_3$ in an amount ranging from about 0.25% to about 7%, such as from about 0.5% to about 5.5%. In some embodiments, the seal material may additionally include $K_2O$ in an amount ranging from about 0.5% to about 1.5%, such as from about 0.75% to about 1.25%.

In some embodiments, the glass or glass ceramic seals 356A-356D may be formed of a silicate glass or glass ceramic seal material comprising $SiO_2$, $B_2O_3$, $Al_2O_3$, CaO, MgO, $La_2O_3$, BaO, and/or SrO. For example, the seal material may include, by weight: $SiO_2$ in an amount ranging from about 30% to about 60%, such as from about 35% to about 55%; $B_2O_3$ in an amount ranging from about 0.5% to about 15%, such as from about 1% to about 12%; $Al_2O_3$ in an amount ranging from about 0.5% to about 5%, such as from about 1% to about 4%; CaO in an amount ranging from about 2% to about 30%, such as from about 5% to about 25%; MgO in an amount ranging from about 2% to about 25%, such as from about 5% to about 20%; and $La_2O_3$ in an amount ranging from about 2% to about 12%, such as from about 5% to about 10%. In some embodiments, the seal material may additionally include BaO in an amount ranging from about 0% to about 35%, such as from about 0% to about 30%, or from about 0.5% to about 30%, including about 20% to about 30%, and/or SrO in an amount ranging from about 0% to about 20%, such as from about 0% to about 15%, of from about 0.5% to about 15%, including about 10% to about 15%. In some embodiments, the seal material may additionally include at least one of BaO and/or SrO in a non-zero amount such as at least 0.5 wt. %, such as both of BaO and SrO in a non-zero amount, such at least 0.5 wt. %. However, other suitable seal materials may be used.

When assembled in a fuel cell stack, such as the fuel cell stack 300 of FIGS. 3A-3C, the top inlet holes 390A may be fluidly connected to the fuel inlets 402 of the interconnect 400 of the stack 300, and the top outlet holes 390B may be fluidly connected to the fuel outlets 404 of the interconnects 400, as shown in FIG. 4A. For example, a glass or glass ceramic seal 424 may be disposed between the top inlet holes 390A and the fuel inlets 402 of an adjacent interconnect 400, and a glass or glass ceramic seal 424 may be disposed between the top outlet holes 390B and the fuel outlets 404 of the adjacent interconnect 400, in order to provide fluid-tight connections.

Figures 9A, 9B:
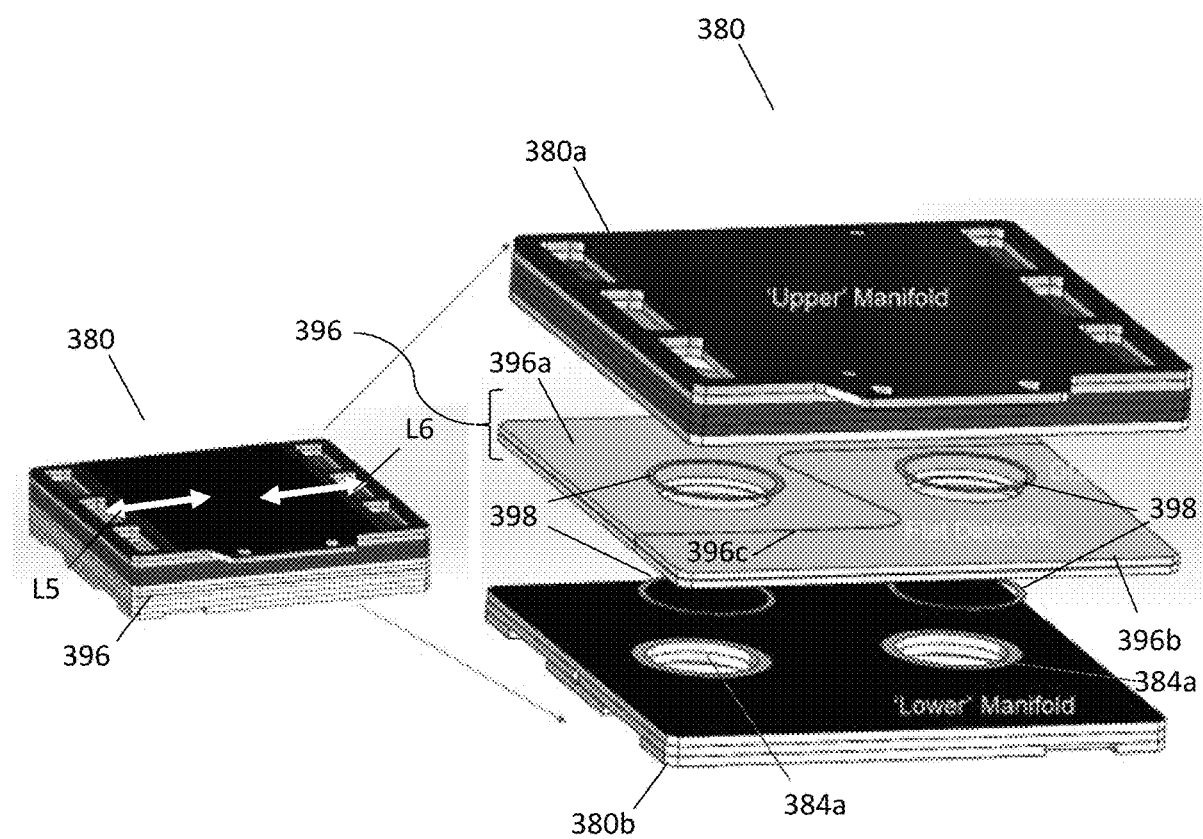
FIG. 9A is a three-dimensional top perspective view of a fuel cell manifold plate having an embedded dielectric layer, according to various embodiments.
FIG. 9B is a three-dimensional exploded view of the fuel cell manifold plate of FIG. 9A, according to various embodiments.

FIG. 9A is a three-dimensional top perspective view of a fuel cell manifold plate 380 having an embedded dielectric layer 396, and FIG. 9B is a three-dimensional exploded view of the fuel cell manifold plate 380 of FIG. 9A, according to various embodiments. The presence of the dielectric layer 396 may reduce leakage currents through the fuel cell manifold plate 380, which may, in turn, act to reduce corrosion of the manifold plate 380 and other structures. The dielectric layer 396 may also prevent short circuit connections that may otherwise cause the system to malfunction and/or may cause damage to system components.

As shown in FIG. 9B, the fuel cell manifold plate 380 may include an upper manifold portion 380a and a lower manifold portion 380b. The dielectric layer 396 may include a first dielectric layer portion 396a and a second dielectric layer portion 396b. As shown, the dielectric layer 396 may be split along a split line 396c. The presence of the split line 396c may reduce thermal stress/strain induced in the dielectric layer 396 due to differences in the CTE of the dielectric layer 396 relative to the CTE of the upper manifold portion 380a and the lower manifold portion 380b. The fuel cell manifold plate 380 may further include seals 398 placed above and below the dielectric layer 396 as shown in FIG. 9B. The seals 398 may include an electrically insulating (e.g., glass or glass-ceramic) material and may have a ring-shape (i.e., "donut shape") geometry. In other embodiments, the seals 398 may have other shapes and may include other materials. The seals 398 surround the bottom inlet hole 384A and the bottom outlet hole 384B which extend through the lower manifold portion 380b and the respective first and second dielectric layer portions 396a and 396b. The seals 398 may prevent leakage of fuel and/or air between the upper manifold portion 380a, the lower manifold portion 380b, and the dielectric layer 396.

Figure 10A:
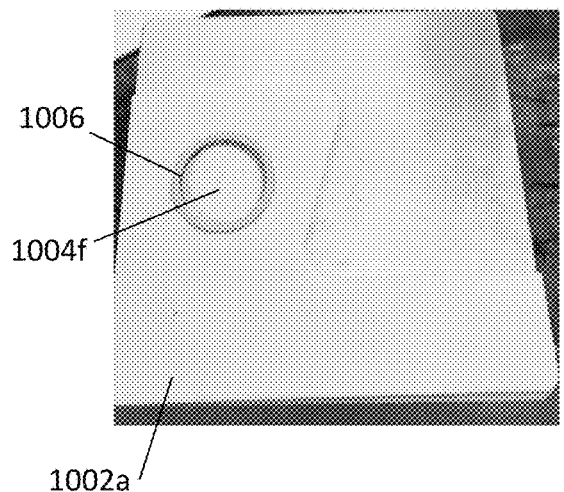
FIG. 10A illustrates an intermediate structure used in the formation of a dielectric layer for a fuel cell manifold plate, according to various embodiments.
Figure 10B:
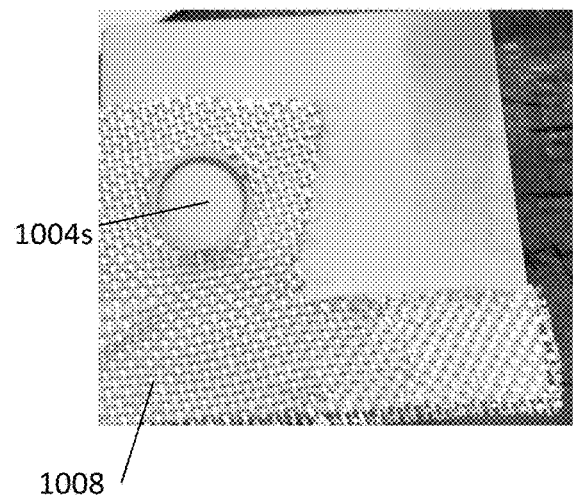
FIG. 10B illustrates a further intermediate structure used in the formation of a dielectric layer for a fuel cell manifold plate, according to various embodiments.
Figure 10C:
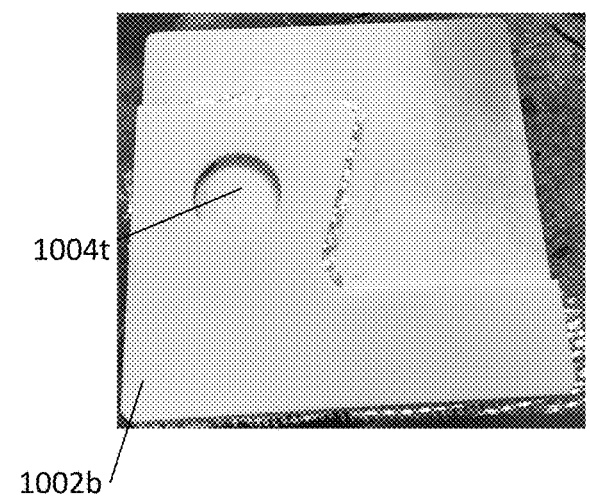
FIG. 10C illustrates a further intermediate structure used in the formation of a dielectric layer for a fuel cell manifold plate, according to various embodiments.
Figure 10D:
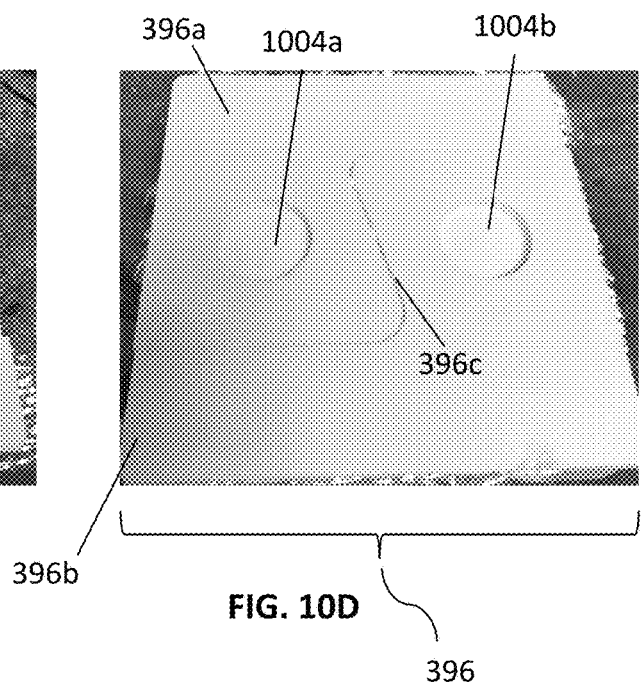
FIG. 10D illustrates a dielectric layer for a fuel cell manifold plate, according to various embodiments.

FIGS. 10A to 10C illustrate intermediate structures used in the formation of the dielectric layer 396 of FIG. 9B, and FIG. 10D illustrates the dielectric layer 396, according to various embodiments. The intermediate structures of FIGS. 10A to 10C illustrate the formation of one of the first dielectric layer portion 396a and the second dielectric layer portion 396b. The intermediate structure of FIG. 10A may be formed by placing an electrically insulating seal 1006 over a first dielectric shim 1002a. For example, the seal 1006 may include an insulating (e.g., glass or glass-ceramic) material and may have a ring-shape (i.e., "donut shape") geometry. In other embodiments, the seal 1006 may have other shapes and may include other materials. The first shim 1002a may include a first hole 1004f configured to form part of one of the inlet conduit passage 352A and the outlet conduit passage 352B, as described above. For example, the first hole 1004f may comprise upper portions of the bottom inlet hole 384A or the bottom outlet hole 384B described above.

In an example embodiment, the first dielectric shim 1002a may include a ceramic material, such as alumina. In other embodiments, the first dielectric shim 1002a may include other materials. The first dielectric shim 1002*a* may have a thickness of 0.5 mm to 5 mm, such as 2 mm to 3 mm. The intermediate structure of FIG. 10B may be formed by placing a fabric 1008 over the first dielectric shim 1002*a*. The fabric 1008 may include an insulating material that is stable at high temperatures. For example, the fabric 1008 may include fiberglass. The fabric may be 0.25 mm to 1 mm thick, such as approximately 0.5 mm thick. In other embodiments, the fabric 1008 may include other materials and may have other thicknesses. The fabric 1008 is cut in the shape of the first dielectric shim 1002*a* such that a second hole 1004*s* also extends through the fabric 1008. The fabric 1008 is placed around the seal 1006 such that the second hole 1004*s* in the fabric 1008 is aligned with the seal 1006 and the first hole 1004*f*.

The intermediate structure of FIG. 10C may be formed by placing a second dielectric shim 1002*b* over the fabric 1008. In an example embodiment, the second dielectric shim 1002*b* may include a ceramic material such as alumina. In other embodiments, the second dielectric shim 1002*b* may include other materials. The second shim 1002*b* may have the same or different thickness as the first shim 1002*a*. For example, the first shim 1002*a* and the second shim 1002*b* may each be approximately 2 mm thick. In other embodiments, the first shim 1002*a* and the second shim 1002*b* may have other thicknesses. A third hole 1004*t* extends through the second shim 1002*b*.

According to an embodiment, the intermediate structure of FIG. 10C may then be sintered under mechanical load at 800° C. to 1200° C., such as 1000° C. at a rate of 1° C./min to 5° C./min, such as 2° C./min, soaked for a minimum of 3 hours, such as 3 to 10 hours, and cooled to room temperature at a rate of 1° C./min to 5° C./min, such as 2° C./min to thereby form a hermetic sandwich assembly. In other embodiments, the intermediate structure of FIG. 10C may be processed in other ways. The resulting hermetic sandwich assembly may form one of the first dielectric layer portion 396*a* and the second dielectric layer portion 396*b* of the dielectric layer 396.

As shown in FIG. 10D, the first dielectric layer portion 396*a* and the second dielectric layer portion 396*b* may be formed as mirror images of one another and may be placed next to one another to thereby be separated by the split line 396*c*, which may be formed as a gap between the first dielectric layer portion 396*a* and the second dielectric layer portion 396*b*. The first dielectric layer portion 396*a* and the second dielectric layer portion 396*b* may be nested between the upper manifold portion 380*a* and the lower manifold portion 380*b*, as shown in FIG. 9B. As mentioned above, the presence of the split line 396*c* (i.e., the gap between first dielectric layer portion 396*a* and the second dielectric layer portion 396*b*) may mitigate thermal stresses/strains due to a mismatch between the CTE of the dielectric layer 396, the upper manifold portion 380*a*, and the lower manifold portion 380*b*.

Each of the respective first dielectric layer portion 396*a* and the second dielectric layer portion 396*b* includes a respective hole 1004*a*, 1004*b* which may comprise upper portions of the bottom inlet hole 384A and the bottom outlet hole 384B described above. Thus, the electrically insulating fabric 1008 containing the second hole 1004*s* is placed between the first electrically insulating shim 1002*a* and the second electrically insulating shim 1002*b* to form an assembly (e.g., first or second portion of the insulating layer 396) in which the first, second and third holes (1004*f*, 1004*s*, 1004*t*) are aligned to each other to form a continuous hole (e.g., 1004*a* or 1004*b*).

Figure 11:
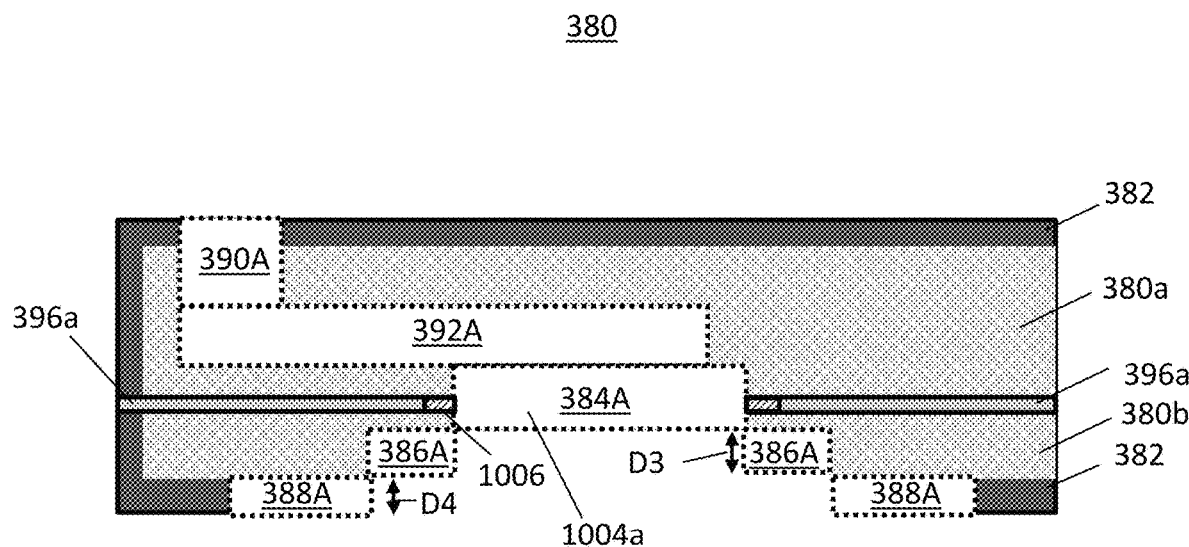
FIG. 11 is a cross-sectional view of the manifold plate of FIG. 9A taken along the line L5 of FIG. 9A, according to various embodiments.

FIG. 11 is a cross-sectional view of the manifold plate 380 of FIG. 9A taken along the line L5 of FIG. 9A, according to various embodiments. As shown in FIG. 11, the manifold plate 380 may include the dielectric layer 396 having the first dielectric layer portion 396*a* sandwiched between the upper manifold portion 380*a* and a lower manifold portion 380*b*. The remaining structural details of the manifold plate 380 are similar to those described above with reference to FIG. 7B.

Figure 12A:
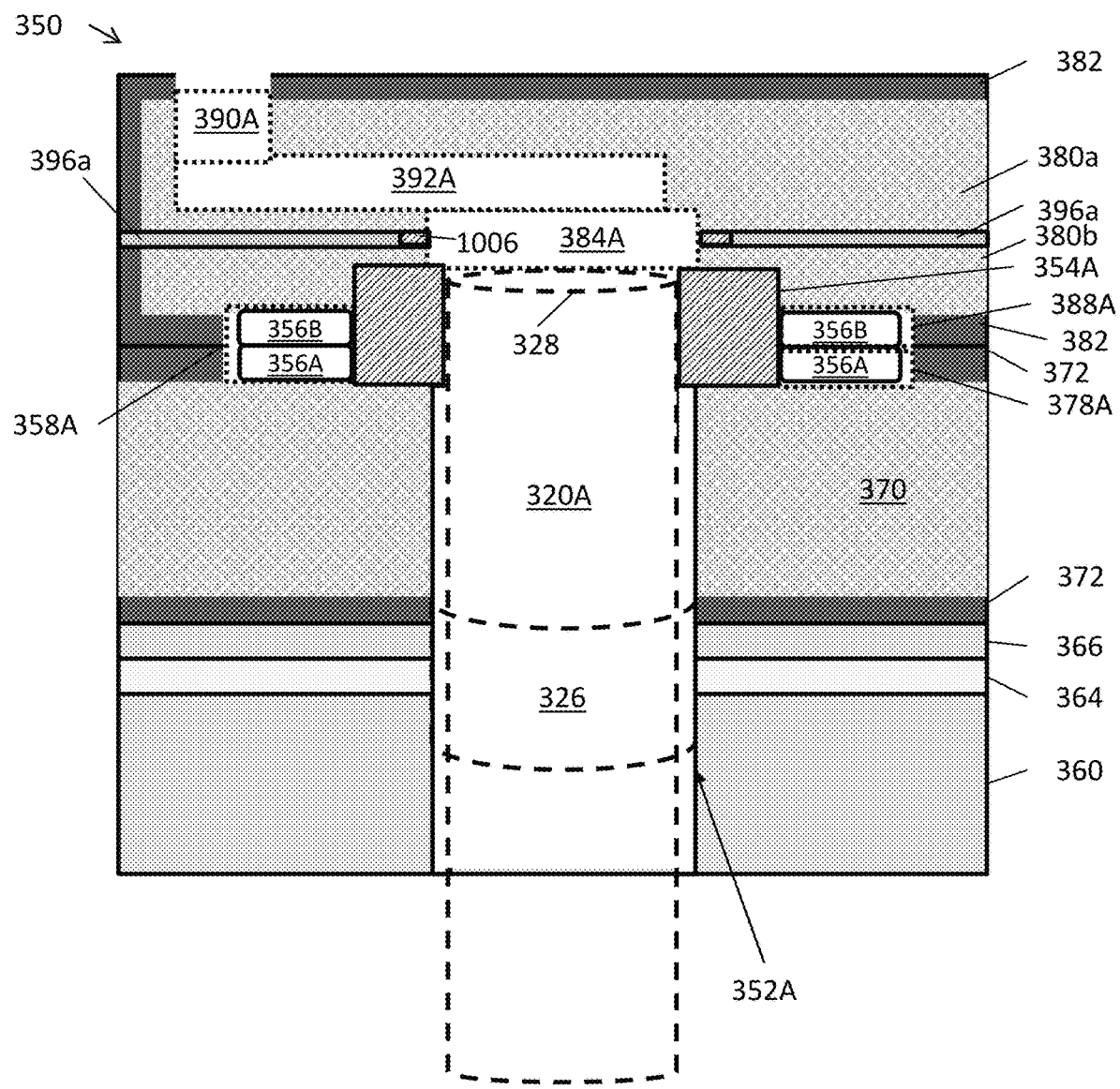
FIG. 12A is a vertical cross-sectional view of a fuel flow structure similar to that of FIG. 8A including the manifold plate of FIGS. 9A and 9B, according to various embodiments.

FIG. 12A is a vertical cross-sectional view of a fuel flow structure similar to that of FIG. 8A including the manifold plate 380 of FIGS. 9A and 9B, according to various embodiments. In this example, the cross section is taken along the line L5 of FIG. 9A. As shown, the fluid flow structure includes the first dielectric layer portion 396*a* sandwiched between the upper manifold portion 380*a* and a lower manifold portion 380*b*. The remaining structural details of the fuel flow structure of FIG. 12A are similar to those described above with reference to FIG. 8A.

Figure 12B:
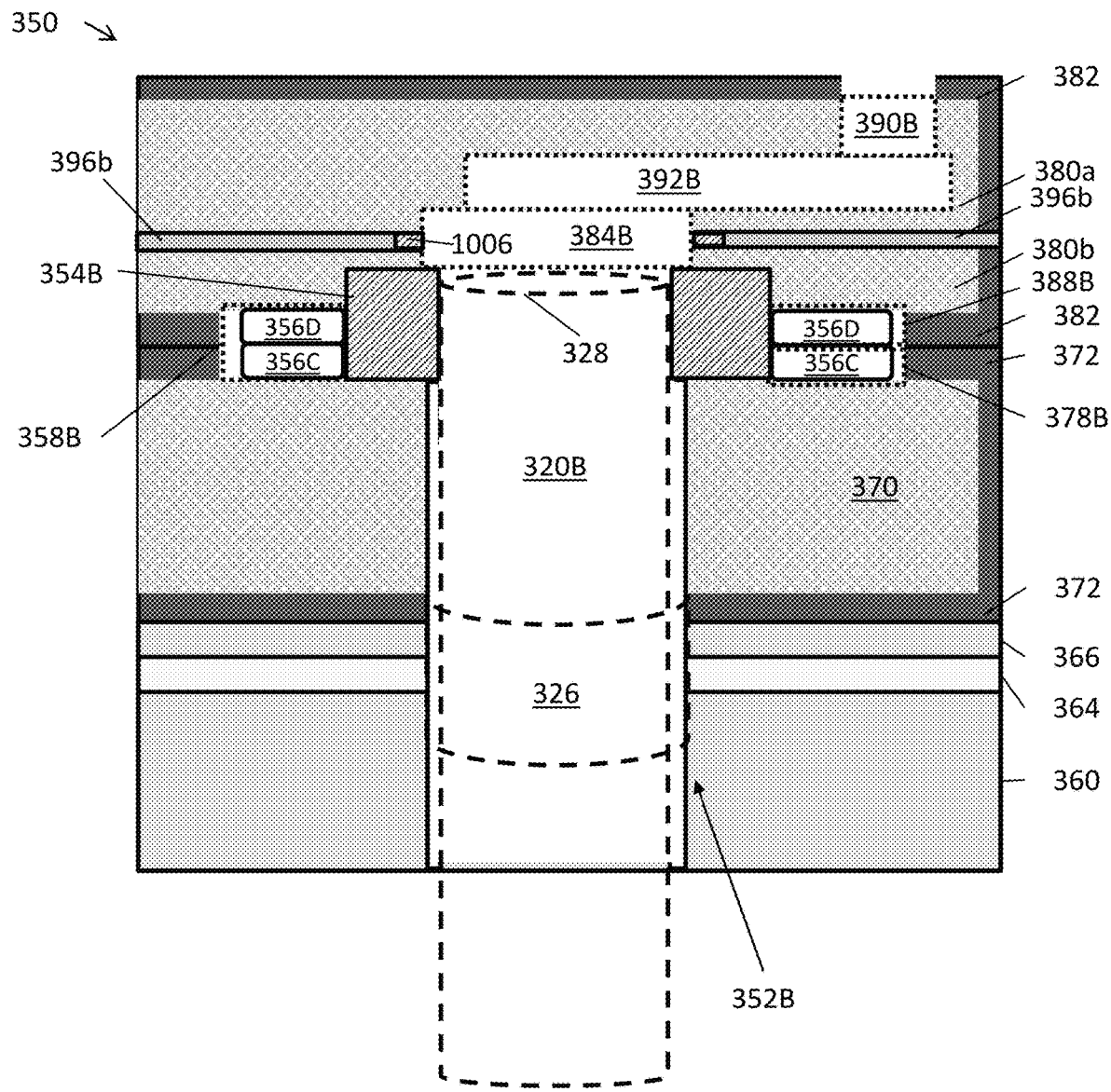
FIG. 12B is a vertical cross-sectional view of a fuel flow structure similar to that of FIG. 8B including the manifold plate of FIGS. 9A and 9B, according to various embodiments.

FIG. 12B is a vertical cross-sectional view of the fuel flow structure similar to that of FIG. 8B but taken along the line L6 of FIG. 9A, according to various embodiments. As shown, the fluid flow structure includes the second dielectric layer portion 396*b* sandwiched between the upper manifold portion 380*a* and a lower manifold portion 380*b*. The remaining structural details of the fuel flow structure of FIG. 12B are similar to those described above with reference to FIG. 8B.

While solid oxide fuel cell interconnects, end plates, electrolytes, and manifold plates are described above in various embodiments, embodiments may include any other fuel cell components, such as molten carbonate, phosphoric acid or PEM fuel cell electrolytes, interconnects or end plates, or any other shaped metal or metal alloy or compacted metal powder or ceramic objects not associated with fuel cell systems.

Fuel cell systems of the embodiments of the present disclosure are designed to reduce greenhouse gas emissions and have a positive impact on the climate.

The foregoing descriptions are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not necessarily intended to limit the order of the operations; these words may be used to guide the reader through the description of the methods. Further, any reference to claim elements in the singular, for example, using the articles "a," "an" or "the" is not to be construed as limiting the element to the singular. Further, any operation or component of any embodiment described herein can be used in any other embodiment.

The preceding description of the disclosed aspects is provided to enable any person skilled in the art to make and/or use the disclosed embodiments. Various modifications to these aspects will be readily apparent to those skilled in the art, and the generic principles defined herein may be applied to other aspects without departing from the scope of the disclosure. Thus, embodiments of the disclosure are not intended to be limited to the aspects shown herein but are to be accorded the widest scope consistent with the principles and novel features disclosed herein.

What is claimed is:

1. A manifold plate for a fuel cell stack, comprising:
   a lower manifold portion;
   an upper manifold portion;
   a dielectric layer sandwiched between the lower manifold portion and the upper manifold portion, the dielectric layer comprising:
      a first dielectric layer portion; and
      a second dielectric layer portion separated from the first dielectric layer portion by a gap formed between the first dielectric layer portion and the second dielectric layer portion;
   a bottom inlet hole and a bottom outlet hole formed in a bottom surface of the lower manifold portion, wherein the bottom inlet hole and the bottom outlet hole extend through the dielectric layer;
   top outlet holes and top inlet holes formed in opposing sides of a top surface of the upper manifold portion;
   outlet channels fluidly connecting the top outlet holes to the bottom inlet hole; and
   inlet channels fluidly connecting the top inlet holes to the bottom outlet hole.

2. The manifold plate of claim 1, wherein the first dielectric layer portion and the second dielectric layer portion are mirror images of each other.

3. The manifold plate of claim 2, wherein the first dielectric layer portion and the second dielectric layer portion are located adjacent to one another in a common plane.

4. A manifold plate for a fuel cell stack, comprising:
   a lower manifold portion;
   an upper manifold portion; and
   a dielectric layer sandwiched between the lower manifold portion and the upper manifold portion, the dielectric layer comprising a first dielectric layer portion and a second dielectric layer portion,
   wherein each of the first dielectric layer portion and the second dielectric layer portion comprise a multi-layer structure comprising:
      a first electrically insulating shim;
      a second electrically insulating shim; and
      an electrically insulating fabric sandwiched between the first electrically insulating shim and the second electrically insulating shim.

5. The manifold plate of claim 4, wherein each of the first dielectric layer portion and the second dielectric layer portion further comprise insulating seals sandwiched between the lower manifold portion and the upper manifold portion.

6. The manifold plate of claim 5, wherein each insulating seal comprises a glass or glass-ceramic ring seal surrounding a respective hole in the dielectric layer.

7. The manifold plate of claim 4, wherein each of the first electrically insulating shim and the second electrically insulating shim comprise a ceramic material.

8. The manifold plate of claim 7, wherein each of the first electrically insulating shim and the second electrically insulating shim comprise alumina.

9. The manifold plate of claim 4, wherein the electrically insulating fabric comprises fiberglass.

10. The manifold plate of claim 1, wherein the gap formed between the first dielectric layer portion and the second dielectric layer portion is configured to mitigate thermal stresses and strains due to a mismatch between a coefficient of thermal expansion of the dielectric layer relative to that of the lower manifold portion and the upper manifold portion.

11. A fuel cell stack fuel flow structure, comprising:
    a base plate comprising an inlet hole and an outlet hole;
    a first dielectric layer disposed on the base plate and comprising an inlet hole and an outlet hole;
    a cover plate disposed on the first dielectric layer and comprising an inlet hole and an outlet hole;
    a seal plate disposed on the cover plate and comprising an inlet hole and an outlet hole; and
    a manifold plate disposed on the seal plate, wherein the manifold plate comprises:
       a lower manifold portion;
       an upper manifold portion;
       a second dielectric layer sandwiched between the lower manifold portion and the upper manifold portion;
       a bottom inlet hole and a bottom outlet hole formed in a bottom surface of the lower manifold portion, wherein the bottom inlet hole and the bottom outlet hole extend through the second dielectric layer;
       top outlet holes and top inlet holes formed in opposing sides of a top surface of the upper manifold portion;
       outlet channels fluidly connecting the top outlet holes to the bottom inlet hole; and
       inlet channels fluidly connecting the top inlet holes to the bottom outlet hole.

12. The fuel cell stack fuel flow structure of claim 11, wherein:
    the inlet holes of the base plate, the first dielectric layer, the cover plate, the seal plate, the lower manifold portion, the second dielectric layer, and the upper manifold portion are aligned to form an inlet conduit passage, and the outlet holes of the base plate, the first dielectric layer, the cover plate, the seal plate, the lower manifold portion, the second dielectric layer, and the upper manifold portion are aligned to form an outlet conduit passage; or
    the inlet holes of the base plate, cover plate, seal plate and manifold plate are aligned to form an inlet conduit passage, and the outlet holes of the base plate, cover plate, seal plate and manifold plate are aligned to form an outlet conduit passage.

13. A fuel cell stack comprising:
    the fuel cell stack fuel flow structure of claim 11,
    interconnects stacked above the fuel cell stack fuel flow structure; and
    fuel cells disposed between the interconnects.

14. The fuel cell stack of claim 13, wherein:
    the fuel cells comprise solid oxide fuel cells;
    the top outlet holes are fluidly connected to fuel inlets of the interconnects; and
    the top inlet holes are fluidly connected to fuel outlets of the interconnects.

15. A method of manufacturing a manifold plate for a fuel cell stack, comprising:
    providing a lower manifold portion and an upper manifold portion;
    providing a dielectric layer; and
    assembling the lower manifold portion, the upper manifold portion, and the dielectric layer into the manifold plate such that the dielectric layer is sandwiched between the lower manifold portion and the upper manifold portion,
    wherein providing the dielectric layer comprises:
       providing a first electrically insulating shim containing a first hole;
       providing a second electrically insulating shim containing a third hole; and
       placing an electrically insulating fabric containing a second hole between the first electrically insulating shim and the second electrically insulating shim to form an assembly in which the first, second and third holes are aligned to each other.

16. The method of claim 15, further comprising:

providing an electrically insulating seal between the lower manifold portion and the upper manifold portion such that the electrically insulating seal surrounds the second hole; and sintering the assembly under a mechanical load.

17. A method of manufacturing a manifold plate for a fuel cell stack, comprising:

providing a lower manifold portion and an upper manifold portion;

providing a dielectric layer; and assembling the lower manifold portion, the upper manifold portion, and the dielectric layer into the manifold plate such that the dielectric layer is sandwiched between the lower manifold portion and the upper manifold portion, wherein:

the dielectric layer comprises a first dielectric layer portion and a second dielectric layer portion;

the first dielectric layer portion and the second dielectric layer portion are separated by a gap formed between the first dielectric layer portion and the second dielectric layer portion; and the first dielectric layer portion and the second dielectric layer portion are located adjacent to one another in a common plane.

18. The method of claim 15, further comprising placing a fuel cell stack over the manifold plate.

19. The method of claim 17, further comprising placing a fuel cell stack over the manifold plate.

20. A fuel cell stack comprising:
a fuel cell stack fuel flow structure;
interconnects stacked above the fuel cell stack fuel flow structure; and
fuel cells disposed between the interconnects,
wherein the fuel cell stack fuel flow structure comprises:
 a base plate comprising an inlet hole and an outlet hole;
 a first dielectric layer disposed on the base plate and comprising an inlet hole and an outlet hole;
 a cover plate disposed on the first dielectric layer and comprising an inlet hole and an outlet hole;
 a seal plate disposed on the cover plate and comprising an inlet hole and an outlet hole; and
 the manifold plate of claim 5 disposed on the seal plate.

21. A fuel cell stack comprising:
a fuel cell stack fuel flow structure;
interconnects stacked above the fuel cell stack fuel flow structure; and
fuel cells disposed between the interconnects,
wherein the fuel cell stack fuel flow structure comprises:
 a base plate comprising a fuel inlet passage and a fuel outlet passage;
 a manifold plate a disposed over the base plate, the manifold plate comprising a lower manifold portion, an upper manifold portion, and a dielectric layer sandwiched between the lower manifold portion and the upper manifold portion;
 a fuel inlet conduit inserted in the fuel inlet conduit passage; and
 a fuel outlet conduit inserted in the fuel outlet conduit passage; and
wherein the dielectric layer contains only two holes comprising a fuel inlet hole which is aligned with the fuel inlet passage and a fuel outlet hole which is aligned with the fuel outlet passage.

* * * * *